UNITED STATES PATENT OFFICE.

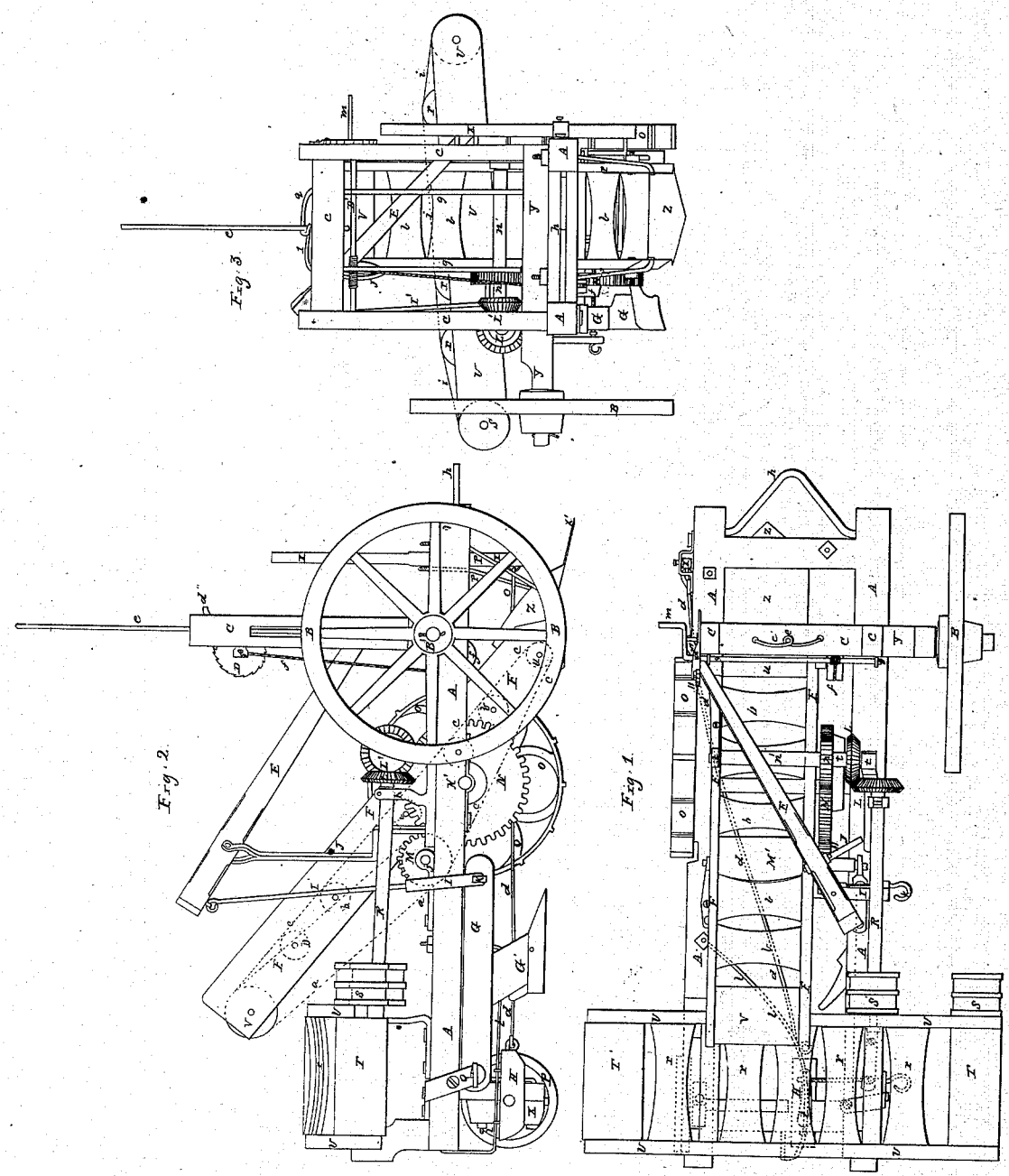

ISAAC R. CRANE, OF WARSAW, MISSOURI.

DITCHING-MACHINE.

Specification of Letters Patent No. 26,566, dated December 27, 1859.

*To all whom it may concern:*

Be it known that I, ISAAC R. CRANE, of Warsaw, in the county of Benton and State of Missouri, have invented a new and Improved Ditching-Machine; and I do hereby declare that the following is a full, clear, and exact description of the same, reference being had to the annexed drawing, making part of this specification, in which—

Figure 1 is a top view, Fig. 2 a side elevation and Fig. 3 a front elevation.

My invention consists in constructing arranging and combining, certain mechanical devices into a machine for the purpose of ditching.

To enable others skilled in the arts to which this appertains, to make and use my said invention, I will proceed to describe the construction and operation thereof.

Similar letters of reference represent corresponding parts of the different figures of the drawing annexed.

Upon the drawing A represents the frame of the machine, which may be made of the form shown by the drawing, or of such other form as will best fill the conditions of strength and convenience. This frame is mounted upon three wheels one of which is shown at O, which I term the driving wheel, as from this wheel all the working parts of the machine receive their motion. Another of these wheels is seen at B, which I term the gage wheel, as by it the depth to which the machine is allowed to sink into the ground is regulated. The third of these wheels, is shown at P, which I term the guide wheel, as by it, the direction of the machine is governed.

The driving wheel is fixed upon a shaft N' which has its bearings in suitable journal boxes, fixed against the under side of the frame. And upon the opposite end of this same shaft, the spur wheel N, is fixed, which meshes in the pinion $n$ fixed upon the shaft $n'$, which is supported by studs $t$, erected upon the frame to receive them. Upon this same shaft $n'$, a bevel wheel L' is fixed, which meshes into a corresponding bevel wheel L fixed upon the shaft R', upon which is also fixed the drum S', from whence a belt is led to the drum S, upon the end of the roller shaft T which thus puts in motion the endless apron $i$ $i'$, leading around the rollers T T, and which is supported by the intermediate rollers $r$ $r$ $r$. The rollers T T and $r$ $r$ $r$ are supported in the frame U, U, which is placed across the back end of the main frame, and secured upon stanchions erected upon the frame to receive it. In the spur wheel N there meshes a second pinion wheel, M, fixed upon the end of the roller shaft M', whereby the said roller receives its motion, and from this roller a belt $a$ $a$ $a$, is led over the roller V, and over the belt $a$ $a$, the endless apron $c$ $c$ $c$ $c$ is drawn around the rollers V and $w$. This endless apron, $c$ $c$ receives its motion through the agency of the belt $a$ $a$, and it is supported in the center by the intermediate wheels or rollers $v$ $v$ $v$. These rollers are supported in the frame F, which is made of the form shown upon the drawing, and which is secured in the main frame at any required angle with the ground, in the manner shown at Fig. 2. To the lower end of the frame F, is fixed a shovel $z$, which is supported by the braces P P in the manner shown.

The axle of the gage wheel B is shown at $y$ and is arranged in the vertical frame $c$ $c$, so that it can be raised or lowered to suit the will of the operator, who governs its position by means of the cord or chain $f$, which is fixed to the lower part of the said axle and passed over the chain $f$; and from thence around the shaft D' which is operated upon by the crank $m$ whereby the said axle is drawn down or allowed to raise as the case may require, and it is held in any given position by means of the ratchet wheel D, and the ratchet $d''$. The said axle $y$ is braced and steadied, by means of the two ears $q$ $q$, which are fixed in the said axle and which pass up through the upper part of the frame $c$ and around the guide rod $e$ in the manner shown.

The axle of the guide wheel P, is supported in a projection H, fixed against the lower part of the main frame, so as to revolve freely about its own axis. The inside end of the said axle, however is supported to and vibrates upon a segment of a circle $l$ $l$ $l$. The said axle is attached to the said segment by means of the block H, and staples which pass over the segment and into the block as shown. The position of the wheel is governed by the lever X which is connected to the block H by means of the rod $d$ $d$ $d$.

Under the right hand side of the frame A and at the back end of it, a plow G' is located, with a left hand mold board, so as to throw the dirt toward the center of the machine. The beam of this plow is shown at G, and the back end of it is fixed upon a center Q around which it is made to vibrate by means of the lever E, which is connected to it by means of the rod I' the lower end of which is in the form of a clevis as shown at I. The lever E being placed under the control of the attendant, enables him to turn the plow in or out of the ground at pleasure. The power is applied at $h$, and the machine when in operation, is continued as far in one direction, as may be desired. It is then turned around and so directed as to cause the drilling wheel to run in the track previously made by the plow, which thus brings the shovel in range with the dirt thrown up, and the machine in advancing causes the dirt to come in contact with the endless apron $c\ c\ c$, which carries it back and deposits it over on the apron $i\ i$, from whence it is deposited on the ground on either side of the ditch, as the apron $i\ i$ may be made to move in either direction, by placing a cross or a straight belt, upon the drums $s'\ s$.

As fast as the ditch increases in depth, the machine is let down into it by letting the axle $y$, rise up in the frame $c$, as described, which thus keeps the gage wheel B on the outside of the ditch, to support the front end of the machine and to gage the shovel.

1. I am aware that plows have been used in combination with a scoop and elevator, I do not therefore claim their combination as such. But I claim the arrangement of the plow $c'$ with the frame A and the scoop $z$ and elevator F, and the described arrangement of devices for operating the said plow in the manner described.

2. I am also aware that ditching machines have been supplied with devices and means of raising and lowering the scoop and elevator out and in the ditch. I do not therefore claim this feature broadly but I claim the arrangement of devices whereby the scoop and elevator of my machine is lowered in and raised out of the ditch in the manner described.

3. I am also aware that different devices have been used for guiding the direction of the machine. I do not therefore claim a guide wheel applied to a ditching machine as such. But I claim the arrangement of the guide wheel P with the frame A and with the arrangement of devices for operating the said wheel as described.

ISAAC R. CRANE.

Witnesses:
C. E. GRAY,
S. J. LEVI.